United States Patent
Müller

[11] Patent Number: 6,106,271
[45] Date of Patent: Aug. 22, 2000

[54] TWO-STAGE EJECTOR

[75] Inventor: Hans Müller, Pejlingsvägen 6, S-506 70 Frufällan, Sweden

[73] Assignee: Hans Müller, Fraufällan, Sweden

[21] Appl. No.: 09/266,243

[22] Filed: Mar. 10, 1999

[51] Int. Cl.⁷ ............................................. B29C 59/00
[52] U.S. Cl. .......................... 425/436 R; 425/192 R; 425/444
[58] Field of Search ........................ 425/182, 192 R, 425/436 R, 444

[56] References Cited

U.S. PATENT DOCUMENTS

| | | | |
|---|---|---|---|
| 4,050,666 | 9/1977 | Van Tichelt | 425/444 |
| 4,054,406 | 10/1977 | Ruegg | 425/436 R |
| 4,239,174 | 12/1980 | Muller et al. | 425/436 R |
| 4,620,958 | 11/1986 | Wiechard | 425/444 |

FOREIGN PATENT DOCUMENTS 4214553  4/1992  Germany ........................... 425/444

*Primary Examiner*—Harold Pyon
*Assistant Examiner*—Thukhanh Nguyen
*Attorney, Agent, or Firm*—Orum & Roth

[57] ABSTRACT

The invention relates to an arrangement for a two-stage ejector for an injection moulding tool. It comprises a piston cylinder arrangement with piston cylinder elements capable of axial displacement relative to one another in separate stages for the actuation of separately moving ejector plates, having the front plate attached to a piston capable of detachable attachment to a sleeve accommodating said piston via radially moving coupling segments. Internally inside the sleeve, which is attached to the rear plate via a threaded connection, an accommodating body for the coupling segments is fixed to the front plate via radial wings. The wings are capable of movement along the sleeve in matching recesses along the rear part of the sleeve.

14 Claims, 7 Drawing Sheets

TWO-STAGE EJECTOR

The present invention relates to an arrangement for a two-stage ejector for an injection moulding tool and comprises a piston cylinder arrangement with piston cylinder elements capable of axial displacement relative to one another in separate stages for the actuation of separately moving ejector plates, having the front plate attached to a piston capable of detachable attachment to a sleeve accommodating said piston via radially moving coupling segments.

Previously disclosed tow-stage ejectors are angular in form and exhibit considerable sizes. They have also required return pins and guide elements for the ejector plates.

The principal object of the present invention is thus, in the first instance, to solve said problems by simple and efficient means.

Said object is achieved by means of an arrangement in accordance with the present invention, the particular features of which can be appreciated from the characterizing part of the Patent Claims.

The invention is described below as a number of preferred illustrative embodiments with reference to the accompanying drawings, in which:

FIG. 1 shows an initial position for the ejector;

FIG. 2 shows a first ejecting stage for the ejector;

FIG. 3 shows a second ejecting stage, and

FIG. 4 shows a sectioned view of a part of the ejector arrangement along the line IV—IV in FIG. 3.

FIG. 5 shows an initial position for the ejector;

FIG. 6 shows a first ejecting stage for a front plate;

FIG. 7 shows a second ejecting stage for a second plate;

FIG. 8 shows a section along the line VIII—VIII in FIG. 6, and

FIG. 9 shows a section along the line IX—IX in FIG. 6.

Figure 1:
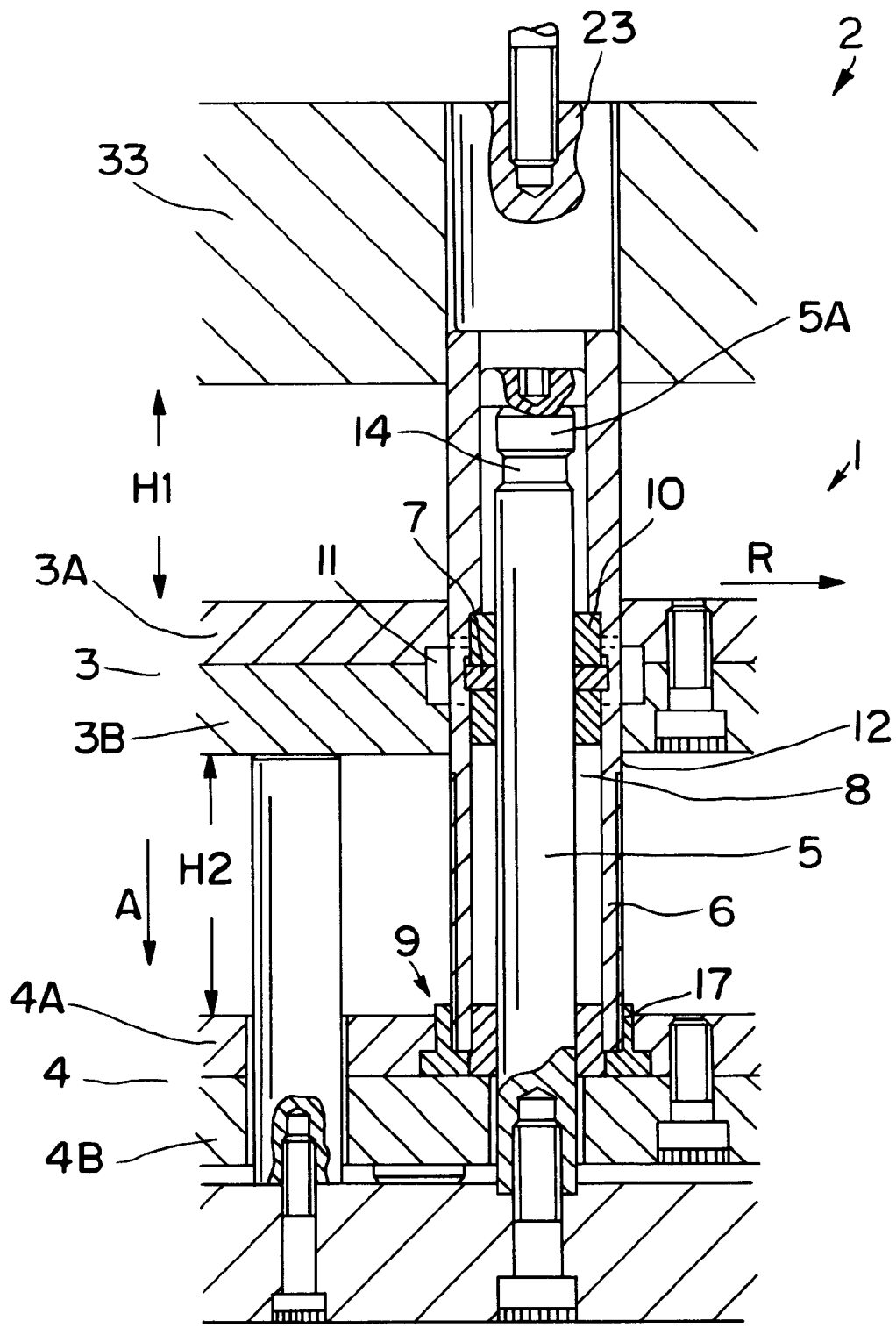
FIGS. 1–4 show a first illustrative embodiment of a two-stage ejector, where
Figure 2:
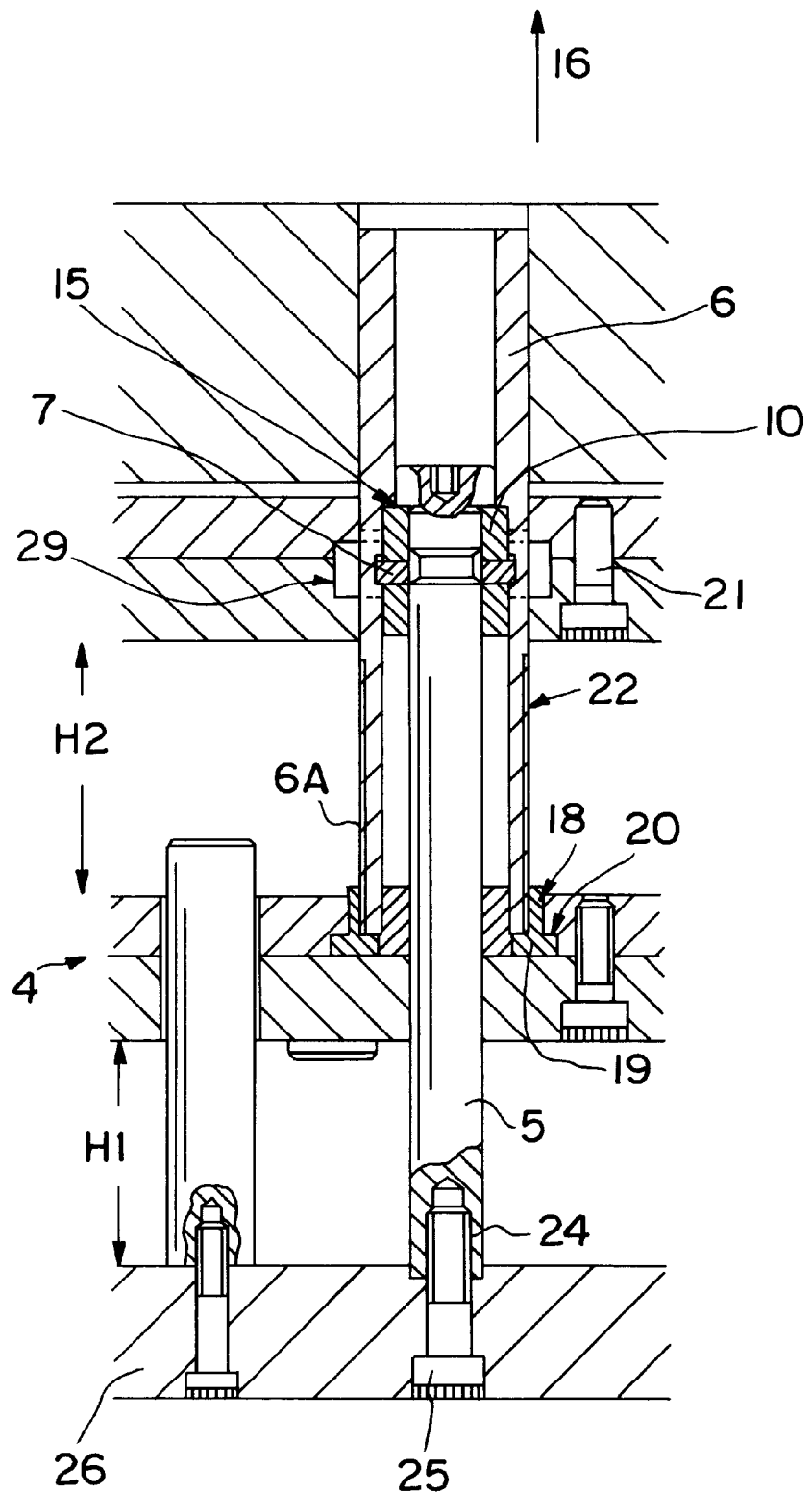
Figure 3:
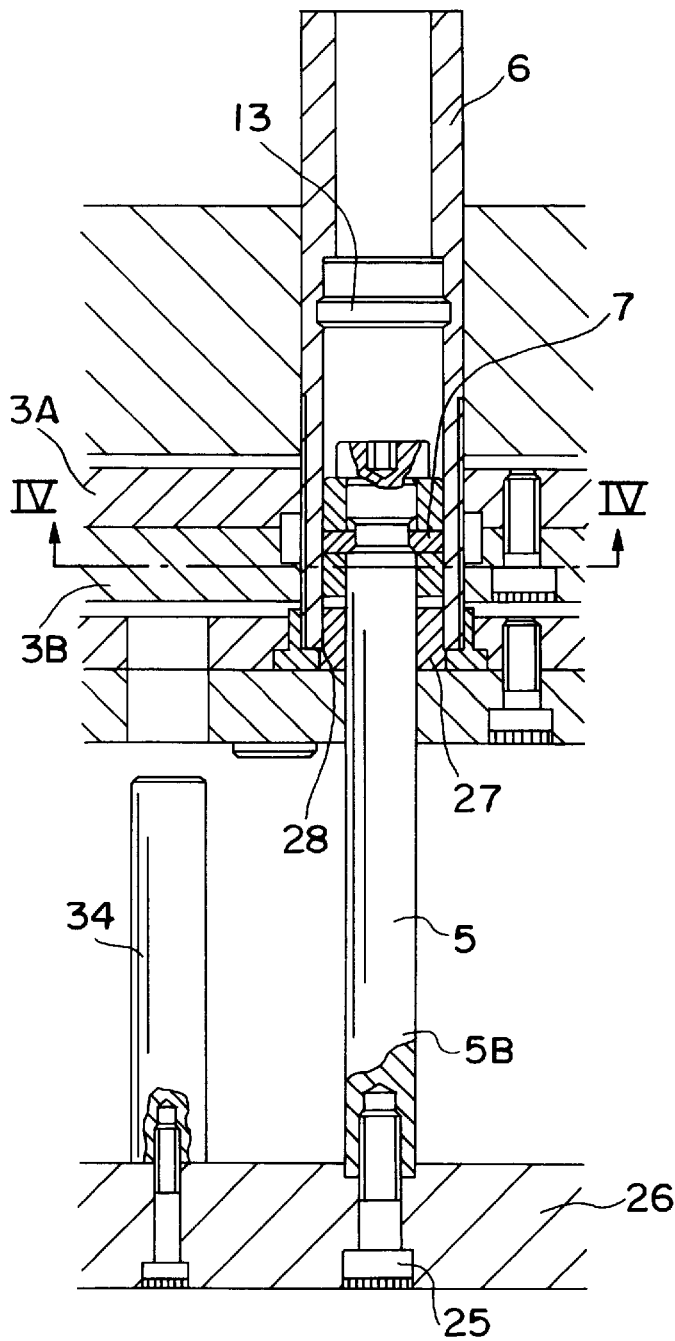
Figure 4:
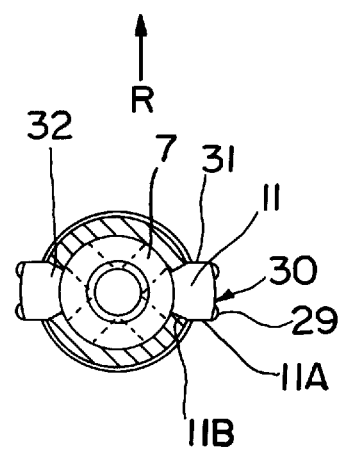

An arrangement 1 for a two-stage ejector 2 for an injection moulding tool exhibits three important functions in said tool:

I: Permitting existing ejector plates 3, 4 to operate in two different stages.

II: Acting as a return element for the ejector plates 3, 4.

III: Simultaneously providing both ejector plates 3, 4 with steady guidance, so that they do not run the risk of moving out of alignment.

The arrangement 1 comprises a piston cylinder arrangement with piston cylinder elements 5, 6 capable of axial displacement relative to one another in separate stages and arranged for the actuation of separately moving ejector plates 3, 4, having the front plate 3 attached to a piston 5 capable of detachable attachment to a sleeve 6, which accommodates said piston, via radially moving coupling segments 7.

In accordance with the invention, the novel and unique feature of the present invention is that, internally 8 inside the sleeve 6, which is detachably attached to the rear plate 4 via a threaded connection 9, an accommodating body 10 for the coupling segments 7 is fixed to the front plate 3 via radial wings 11 capable of axial A movement along the sleeve 6 in matching slot-shaped recesses 12 along with the rear part 6A of the sleeve.

The wings 11, which are attached to the internal body 10, are built in between the two front ejector plates 3, by the wings 11 being milled into recesses 29 therein in order to hold the body 10 in place. The body 10 centralizes the two-stage ejector in the plate 3.

A peripheral groove 13 extends internally in the sleeve 6 in its envelope surface, and a peripheral groove 14 extends externally around and in the piston 5 to permit the alternating radial transfer of coupling segments between the grooves 13, 14.

A stop 15 arranged internally inside the sleeve 6 is so arranged so to interact with the accommodating body 10 to prevent it from being caused to move in a direction 16 away from said threaded connection 9 of the sleeve.

Said sleeve 6 is attached to the threaded connection 9, which is formed by an internal nut 18 provided with threads 17, which exhibits a radially thickened area, for example in the form of a ring 19 at its base, and which is accommodated in a milled recess 20 between the parts 4A, 4B of the rear plate, which are connected to one another with a screw 21. External threads 22 on the outer envelope surface of the sleeve 6 are screwed into said threads 17 of the nut in order to secure the parts to one another. By cutting the sleeve 6 to length, the length of stroke H2 can be changed to the desired position. Once the sleeve 6 is at the right length, the length of a part 23 is adapted so that the return of the ejector plates is guaranteed to be correct.

In order to obtain the desired length of stroke H1 for the front ejector plate 3, the central piston is shortened at its lower part and is then drilled and threaded again to form a hole 24, in which a screw 25 attaches said piston 5 to the machine part 26.

A counter-pressure body 27 is also capable of being accommodated internally in the sleeve 6 directly in line with the externally enclosing nut 18, which also forms a stop 28 to support the end edge of the sleeve 6.

The external threads 22 on the sleeve 6 extend for a significant proportion of its length corresponding at least to the distance for which the slot-shaped recesses 12 in the sleeve 6 extend.

The peripheral groove 14 in the piston 5 is situated at the front end 5A of the piston, and the rear end 5B of the piston is attached to the machine frame 26 by means of a screwed connection 25.

The fixing wings 11, which are accommodated in recesses 29 in part 3A, 3B of the front plate securely attached to the body 10 in the sleeve 6, exhibit a widening form when viewed outwards from said body 10. The wings 11 are appropriately curved along their outsided 30 and exhibit essentially parallel side parts 31 at the outer part 11A of the wings and taper at the inner part 11B of the wings to a narrower part 32. Among other things, this prevents said ejector plates 3, 4 from tilting.

The axial carrying capacity of the segments 7 is particularly high, since these bear against the largest possible diameter in the high-loading phase and provide a relatively large contact surface. The two-stage ejector can accordingly be manufactured in small diameters. At the same time, this system means that the segments 7 can be manufactured so that their internal diameter is suitable for the piston 5 and, at the same time, so that their external diameter is suitable for the sleeve 6.

The most appropriate position is to have one or two two-stage ejectors at either end of the tool 26, 33. The rear plate 4 is controlled by means of a guide 34 in the form of a bar, and it also forms a stop against the front plate 3.

The function and nature of the invention should by now have been appreciated from the foregoing, and the operating sequence for the two-stage ejector may be described briefly as follows:

Operating sequence:

I. Both ejector plates 3, 4 move simultaneously H1.

II. The front ejector plate 3 stops and is locked, while the rear ejector plate 4 continues H2.

III. The rear ejector plate 4 is retracted H2.

IV. Both ejector plates 3, 4 move back H1.

The advantages of installing these two-stage ejectors are:

a. The tool 26, 33 can be entirely smooth on its underside, to facilitate handling and transport.

b. The arrangement 1 replaces ordinary return pins.

c. The arrangement 1 replaces other guide elements for the ejector plates.

d. The arrangement 1 is fully integrated in the ejector plates 3, 4.

e. The arrangement 1 can be manufactured in relatively small dimensions, and yet can be wear-resistant and capable of withstanding relatively high loads.

Figure 5:
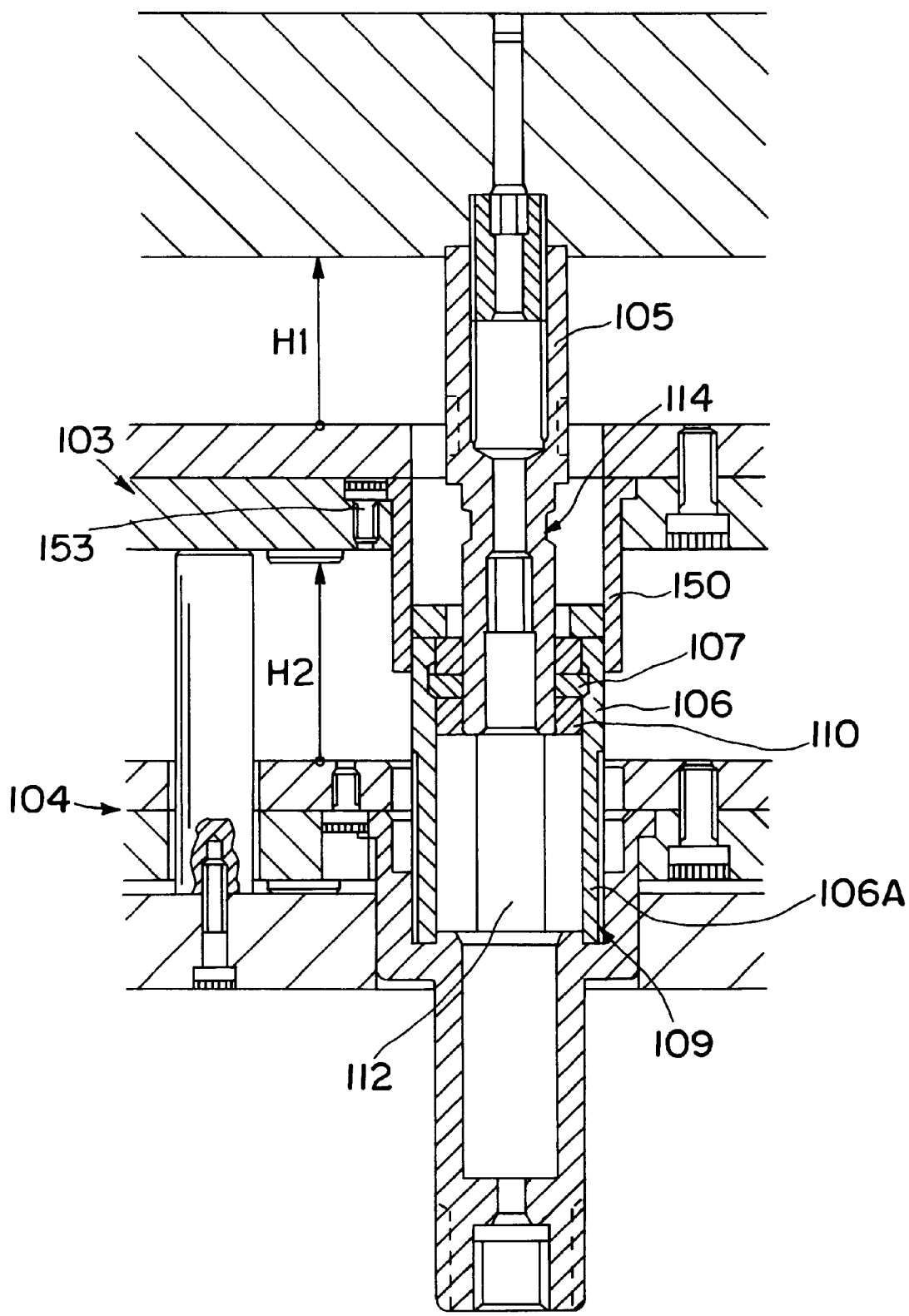
FIGS. 5–9 show a second illustrative embodiment of a two-stage ejector, where
Figure 6:
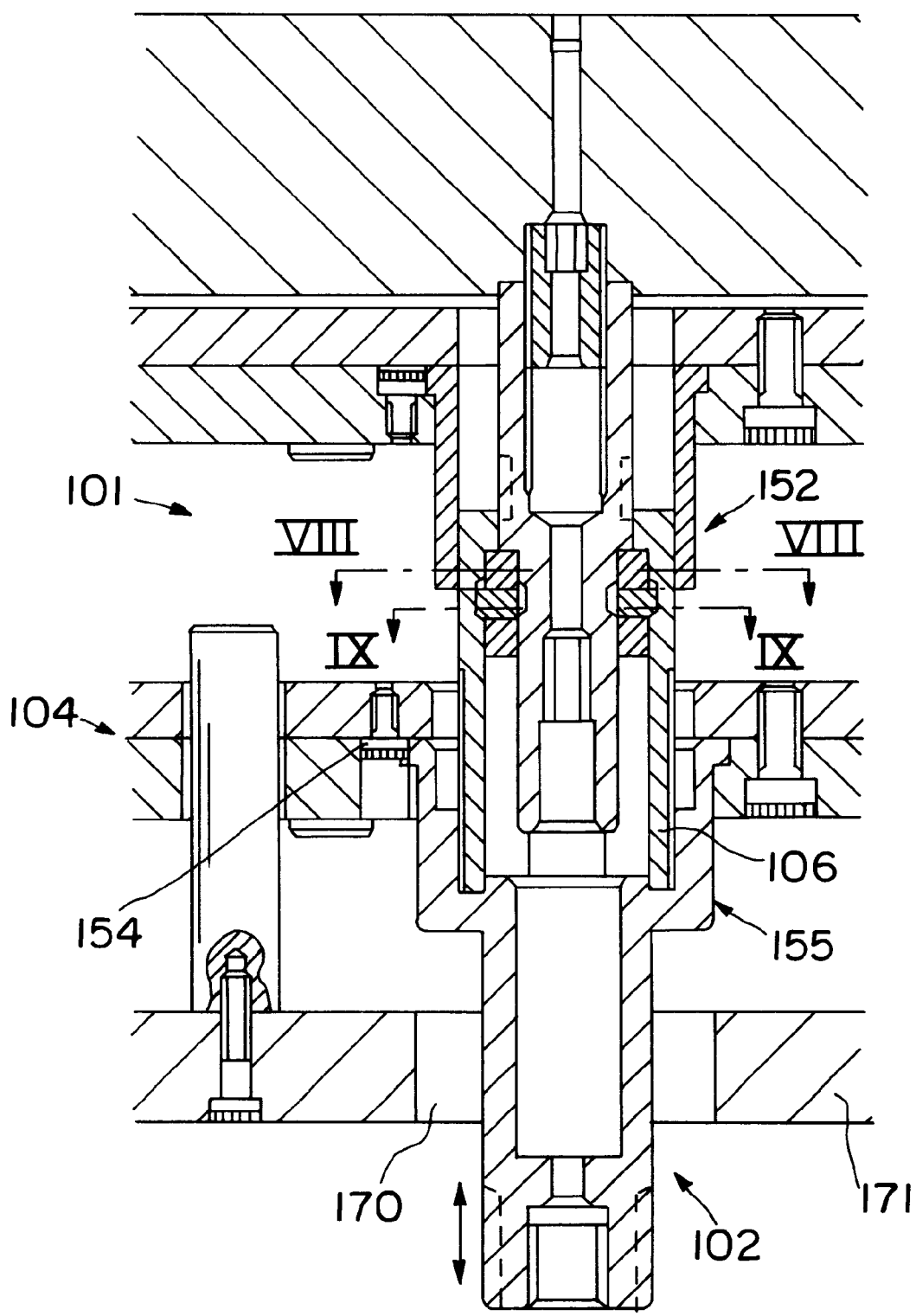
Figure 7:
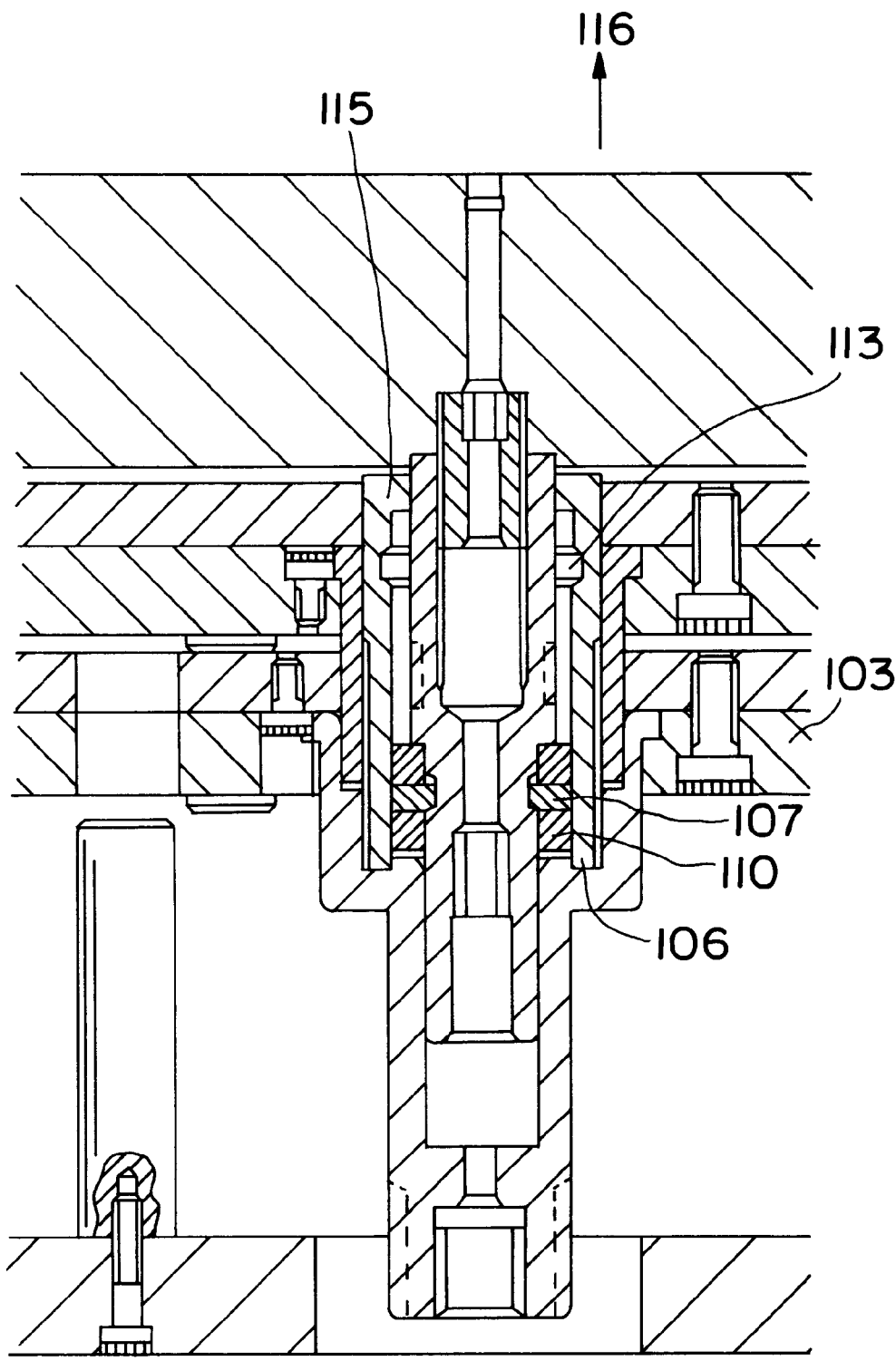
Figure 8:
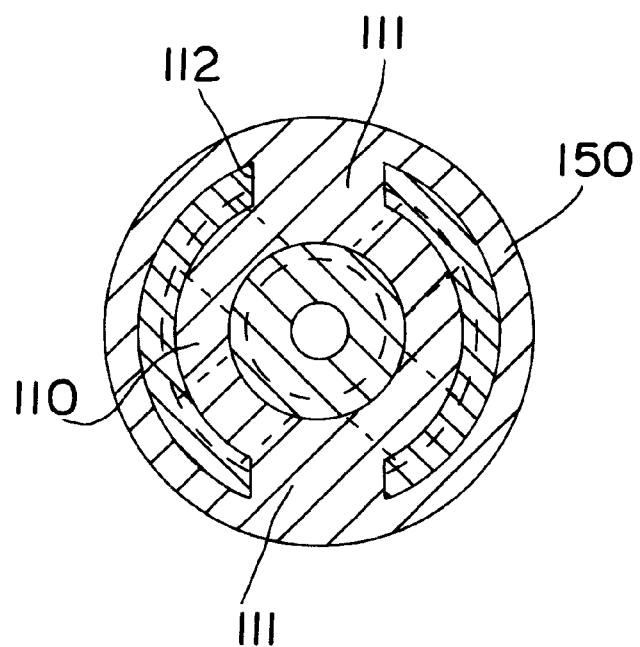
Figure 9:
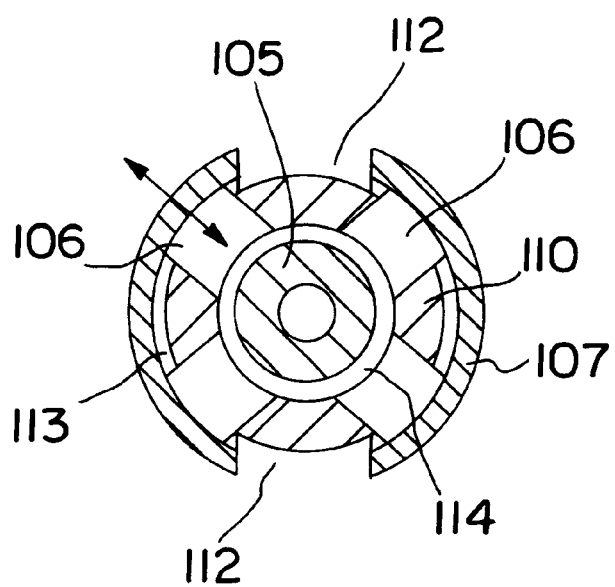

A variant of the two-stage ejector 102 illustrated in FIGS. 5–9 is so arranged as to exhibit the same function as the above ejector, but is constructed for central installation. A feature common to both illustrative embodiments is the fact that they are suitable for injection moulding machines with small central holes, for example having a diameter of 36.5 mm, which 50% of the machines in use on the USA market have.

The corresponding parts which exhibit the same function as those in accordance with the earlier illustrative embodiment have here been given the same designation, but increased by one hundred. An arrangement 101 for a two-stage ejector 102 intended for an injection moulding tool comprising piston cylinder arrangements 105, 106 with piston cylinder elements capable of axial displacement relative to one another in separate stages for the actuation of separately moving ejector plates 103, 104, having the front plate 103 attached to a piston 105 capable of detachable attachment to a sleeve 106 accommodating said piston 105 via radially moving coupling segments 107, thus comprises the following:

Internally inside the sleeve 106, which is attached to the rear plate 104 via a threaded connection 109, an accommodating body 110 for the coupling segments 207 is fixed to the front plate 103 via radial wings 111 capable of movement along the sleeve 106 in matching recesses 112 along the rear part 106A of the sleeve. The sleeve 106 is in two parts 106, 150 in the form of a telescope 152, and the ejector 102 is arranged for central installation. The sleeve 150 and the accommodating body 110 are attached to one another and appropriately for a common body.

A peripheral groove 113, 114 extends internally in the sleeve 106 and externally around the piston 105 to permit the alternating radial transfer of coupling segments 107 between the grooves 113, 114 through said accommodating body 110. A stop 115 arranged internally inside the sleeve 106 is capable of interacting with the accommodating body 110 in a direction 116 away from said threaded connection 109 of the sleeve.

Said inner sleeve 106 of the two sleeves 106, 150 constituting the telescope 152 is slotted, whereas the outer sleeve 150 is attached by means of a screw 153 to the front plate 103.

The inner sleeve 106 is attached to the rear plate 104 by means of internal threads that are screwed into the threads in a enclosing cylinder 154 moving axially through an opening 170 in a machine plate 171.

Said cylinder 155 is screwed securely to the rear plate 104 by means of a screw 154.

The piston and the piston cylinder exhibit an intentionally excessive length from the outset, to enable the user to cut them simply to the right length, so that the desired length of stroke H1, H2 can be adjusted for the respective plate 103, 104.

The invention is not restricted to the illustrative embodiments shown and described here, but may be varied within the scope of the Patent Claims without departing from the idea of invention.

What is claimed is:

1. Arrangement for a two stage ejector for an injection moulding tool comprising a piston cylinder arrangement with piston cylinder elements arranged and constructed for axial displacement relative to one another in separate stages for the actuation of separately moving ejector plates having the front plate attached to a piston arranged and constructed for detachable attachment to a sleeve accommodating said piston via radially moving coupling segments, and accommodating body for the coupling segments is disposed inside the sleeve, which is attached to the rear plate via threaded connections, and is fixed to the front plate via radial wings arranged and constructed for movement along the sleeve in matching recesses along the rear part of the sleeve, the fixing wings, which are securely attached to the body in the sleeve, exhibit a widening form when viewed radially outwards from said body, the fixing wings being curved along their outside, and exhibiting essentially parallel side parts at the outer part of the wings.

2. Arrangement as claimed in claim 1, characterized in that a peripheral groove extends internally in the sleeve and externally around the piston to permit the alternating radial transfer of coupling segments between the grooves.

3. Arranged as claimed in claim 1, characterized in that an internal stop inside the sleeve arranged and constructed to interact with the accommodating body in a direction away from said threaded connection of the sleeve.

4. Arrangement as claimed in claim 1, characterized in that the threaded connection is formed by an internally threaded nut, which exhibits a radially thickened area at its base and is accommodated between the parts of the rear plate, which are connected to one another.

5. Arrangement as claimed in claim 1, characterized in that a counter-pressure body is capable of being accommodated internally in the sleeve directly in line with the externally enclosing nut.

6. Arrangement as claimed in claim 1, characterized in that the sleeve exhibits an external thread along a portion of its length corresponding at least to the distance for which the recesses in the sleeve extend.

7. Arrangement as claimed in claim 1, characterized in that the peripheral groove in the piston is situated at its front end, and in that the rear end of the piston is attached to the machine frame by means of a screwed connection.

8. Arrangement as claimed in claim 1, characterized in that the fixing wings are accommodated in recesses in parts of the front plate, which are attached to one another via a screwed connection.

9. Arrangement for a two-stage ejector according to claim 1, wherein the sleeve is in two parts in the form of a telescope, and wherein the ejector is arranged for central installation.

10. Arrangement as claimed in claim 9, wherein the inner sleeve of the two sleeves constituting the telescope is slotted.

11. Arrangement as claimed in claim 10, wherein in the outer sleeve is attached by means of a screw to the front plate.

12. Arrangement as claimed in claim 11, wherein the inner sleeve is attached by means of a screw to the rear plate.

13. Arrangement as claimed in claim 12, wherein the inner sleeve is screwed by means of external threads into the threads in an enclosing cylinder arranged and constructed for axial movement, and in that said cylinder is screwed securely to the rear plate by means of a screw.

14. Arrangement as claimed in claim 9, wherein the piston and the piston cylinder exhibit an excessive length from the outset, to enable them to be cut to permit adjustment of the desired length of stroke for the respective plate.

* * * * *